United States Patent
Ku

(10) Patent No.: US 6,571,944 B2
(45) Date of Patent: Jun. 3, 2003

(54) FASTENING DEVICE FOR OPTICAL DISC HOLDER

(75) Inventor: Chia-Chun Ku, Taipei (TW)

(73) Assignee: Sinta Technology Corp., Taipei Hsien (TW)

( * ) Notice: Subject to any disclaimer, the term of this patent is extended or adjusted under 35 U.S.C. 154(b) by 0 days.

(21) Appl. No.: 09/820,669

(22) Filed: Mar. 30, 2001

(65) Prior Publication Data

US 2002/0139698 A1 Oct. 3, 2002

(51) Int. Cl.[7] ............................................... B65D 85/57
(52) U.S. Cl. .................... 206/308.1; 206/309; 206/493; 206/806
(58) Field of Search ...................... 206/308.1, 309–312, 206/493, 303, 806

(56) References Cited

U.S. PATENT DOCUMENTS

| | | | | |
|---|---|---|---|---|
| 4,511,194 A | | 4/1985 | Park et al. | |
| 4,722,439 A | * | 2/1988 | Grobecker et al. | 206/308.1 |
| 4,771,890 A | * | 9/1988 | Hofland et al. | 206/308.1 |
| 5,509,528 A | * | 4/1996 | Weisburn | 206/308.1 |
| 5,533,615 A | | 7/1996 | McCamy | |
| 5,690,218 A | * | 11/1997 | McCamy et al. | 206/303 |
| 5,845,771 A | * | 12/1998 | Fu | 206/308.1 |
| 5,924,564 A | | 7/1999 | Lin | |
| 5,938,020 A | | 8/1999 | Luckow | |
| 6,155,417 A | * | 12/2000 | Flores et al. | 206/308.1 |
| 6,405,859 B1 | * | 6/2002 | Ku | 206/308.1 |
| 6,283,285 B1 | * | 9/2002 | Ikebe et al. | 206/310 |

* cited by examiner

Primary Examiner—Shian Luong
(74) Attorney, Agent, or Firm—Birch, Stewart, Kolasch & Birch, LLP

(57) ABSTRACT

A fastening device for an optical disc holder according to the present invention includes a fixed clamp and at least a resilient clamp formed on a carrier. The fixed clamp and the resilient clamp are formed on opposite positions along a longitudinal direction on at least one side of the carrier for holding the rim of the disc by resilient force of the resilient clamp. The resilient clamp locates against the insertion direction of the optical disc so as to be moved for receiving the disc when being pressed, and retrieve to a normal position for fastening the disc in place by incorporating with the fixed clamp.

21 Claims, 12 Drawing Sheets

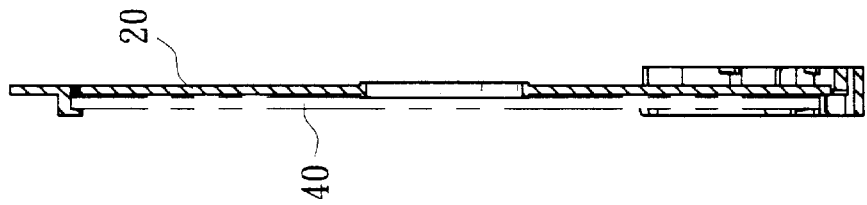
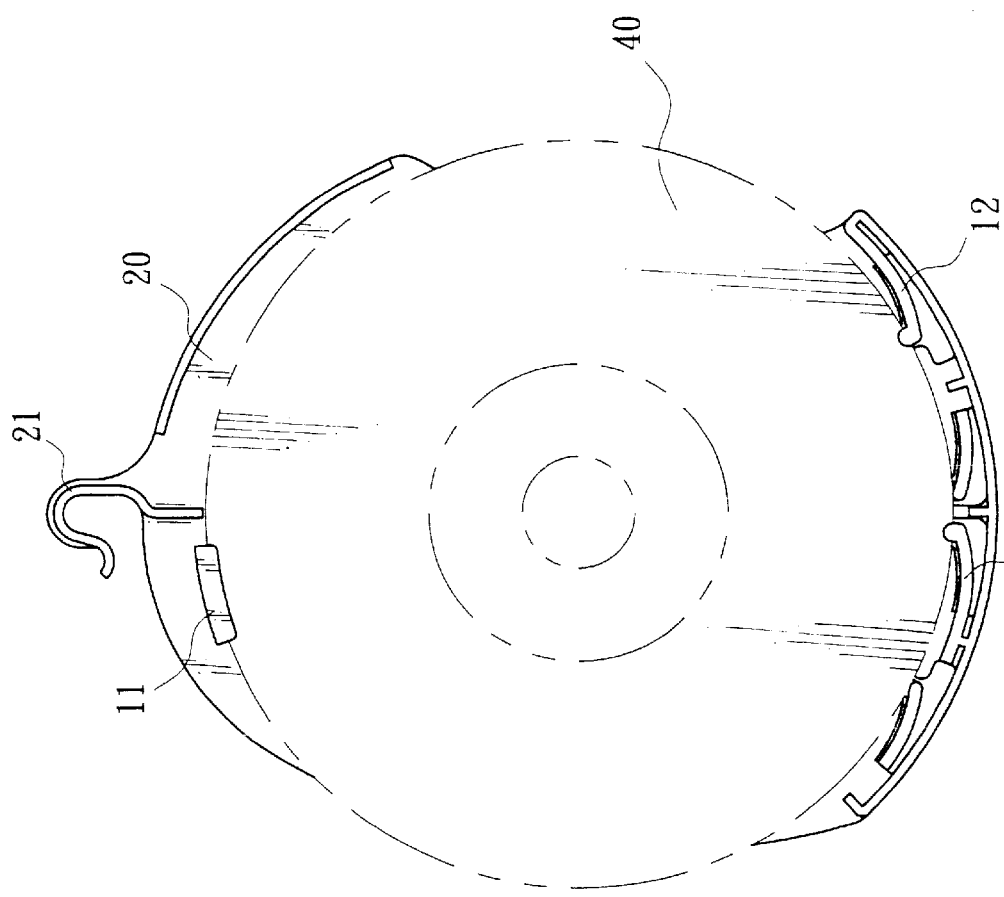

FASTENING DEVICE FOR OPTICAL DISC HOLDER

BACKGROUND OF THE INVENTION

1. Field of Invention

The present invention generally relates to a device for fastening an optical disc to a disc carrier, and more particularly relates to a fastening device that can fasten the optical disc simply by one-hand operation of the user.

2. Related Art

Optical discs, such as compact discs, versatile compact discs and CD-ROMs, are now a kind of widely used information storage media in our daily life for storing music, video or digital information. Currently, an optical disc is generally a round plane disc with a diameter of about 120 mm and having a central through hole. Outside the center hole, there is a circular disused portion with a width about 15 mm. Outside the center disused portion, there is the circular data portion. Finally, at the periphery of the disc, there is a circular outer disused portion having a width about 1 mm. To prevent the disc from being spoiled or damaged, an optical disc can be generally stored in a disc cassette, as shown in FIG. 1. The disc cassette includes a base, a cover and a holder. The base and the cover are made of transparent plastic by an injection molding process as two separated elements and pivotally linked into a foldable box. The holder is mounted on the base for grasping the optical disc and prevent the disc from contacting its data and reflective surfaces to the surfaces of the holder. Some grasping fingers are formed in the center portion of the disc cassette for holding the disc at the center hole. The grasping fingers have to be elastic and strong enough for fixing the disc in position by the center hole. The center hole is an ideal portion for holding the disc since the adjacent disused portion has no data formed thereon. The holder is also made of plastic by injection molding, and utilizes the elastic characteristics of plastic for the grasping force.

In the aforesaid conventional disc cassette, in order to fasten the optical disc, the grasping fingers of the holder have to be elastic and strong enough. Therefore, when using, the user has to push the disc into or pull it out from the grasping fingers of the holder with a certain force against the grasping force of the fingers. As a result, unsuitable force may be applied to the disc and cause a bending or even damage to the disc.

For storage of the optical discs, the user may use the original cassettes and collect them with a magazine, or use a storage tower or cabinet that includes a plurality of carriers for holding optical discs. The storage device generally holds the optical discs at the rims instead of the center holes.

Some kinds of disc cassette or holder are disclosed in U.S. Pat. Nos. 4,511,194; 5,533,615; 5,845,771; 5,924,564 and 5,938,020.

U.S. Pat. No. 4,511,194 discloses a magazine and a plurality of disc holders for supporting a plurality of discs in the magazine. The magazine comprises a pair of opposite walls lying in parallel planes and having an open side between said walls through which the disc holders can be inserted in and removed from the magazine. The disc holders each comprises a plate with attachment means for attaching a disc to one side or each side of the plate. The attachment means comprise spring fingers lying on an imaginary circle having a diameter larger than that of the disc for engaging the disc at its peripheral.

U.S. Pat. No. 5,845,771 discloses a case for a compact disc, which has an upper cover provided with a number of first bars and a lower cover integrally formed and pivotally connected with the upper cover and provided with a number of second bars alternately displaced with the first bars of the upper cover, such that two compact discs are able to be retained within the case. The bars for holding the discs still apply grasping force to the discs and could damage the discs if not being well operated.

In U.S. Pat. No. 5,533,615, a disk storage case also comprises a cover, a planar surface with a receptacle, and retention means. The retention means include a fixed lip and a pivotable lip operated by a button. Instead of conventional retention means at the center hole, the retention means work at the rim of the disc. But the placing or releasing of the disc has to be operated by the user with one hand holding the disc, and the other hand operating the retention means.

In U.S. Pat. No. 5,924,564, the disk storage device applicable to a disc cassette includes a bottom shell, an upper shell and a disc holder plate. A further spring element is fastened to the disc holder plate for imparting a pressure to the stored disc and causing the center hole of the stored disc to be firmly retained in engagement with a retainer flange adapted to engage the center hole of the stored disc. The operations still require two hands of the user. And, the components are more complicated and costly.

In U.S. Pat. No. 5,938,020, a cassette for storing disc includes a lower shell and an upper shell that is pivotally connected to the lower shell. At least one release button, in a starting position, holds the upper shell in a fixed location relative to the lower shell. In a release position, the release button allows the pivoting of the upper shell relative to the lower shell. After pivoting the upper shell upwardly relative to the lower shell, the compact disk is released. The cassette won't apply significant clamping force to the disc, but it requires mechanisms of upper shell, lower shell and release button.

SUMMARY OF THE INVENTION

It is therefore an object of the present invention to provide a holder with simpler fastening construction that can hold an optical disc by the rim of the disc.

Another object of the present invention is to provide a fastening device for an optical disc holder that can be operated by one hand of the user.

A fastening device for an optical disc holder according to the present invention includes a fixed clamp and at least a resilient clamp formed on a carrier. The fixed clamp and the resilient clamp are formed on opposite positions along a longitudinal direction on one side of the carrier for holding the rim of the disc by resilient force of the resilient clamp. The resilient clamp locates against the insertion direction of the optical disc so as to be moved for receiving the disc when being pressed, and retrieve to a normal position for fastening the disc in place by incorporating with the fixed clamp.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow illustration only, and thus are not limitative of the present invention, and wherein:

FIGS. 6A, 6B are functional front and side views of the present invention showing a disc already inserted;

DETAILED DESCRIPTION OF THE INVENTION

Figure 1:
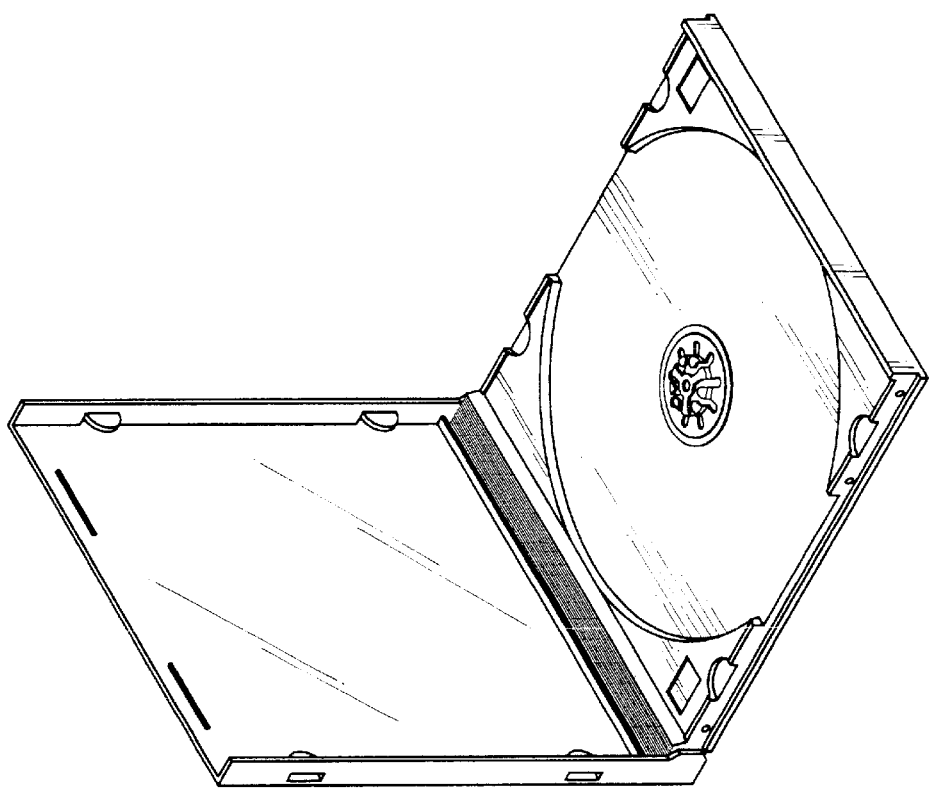
FIG. 1 is a perspective view of a conventional disc cassette.

FIG. 1 shows a conventional optical disc cassette, which has been described above.

Figure 8:
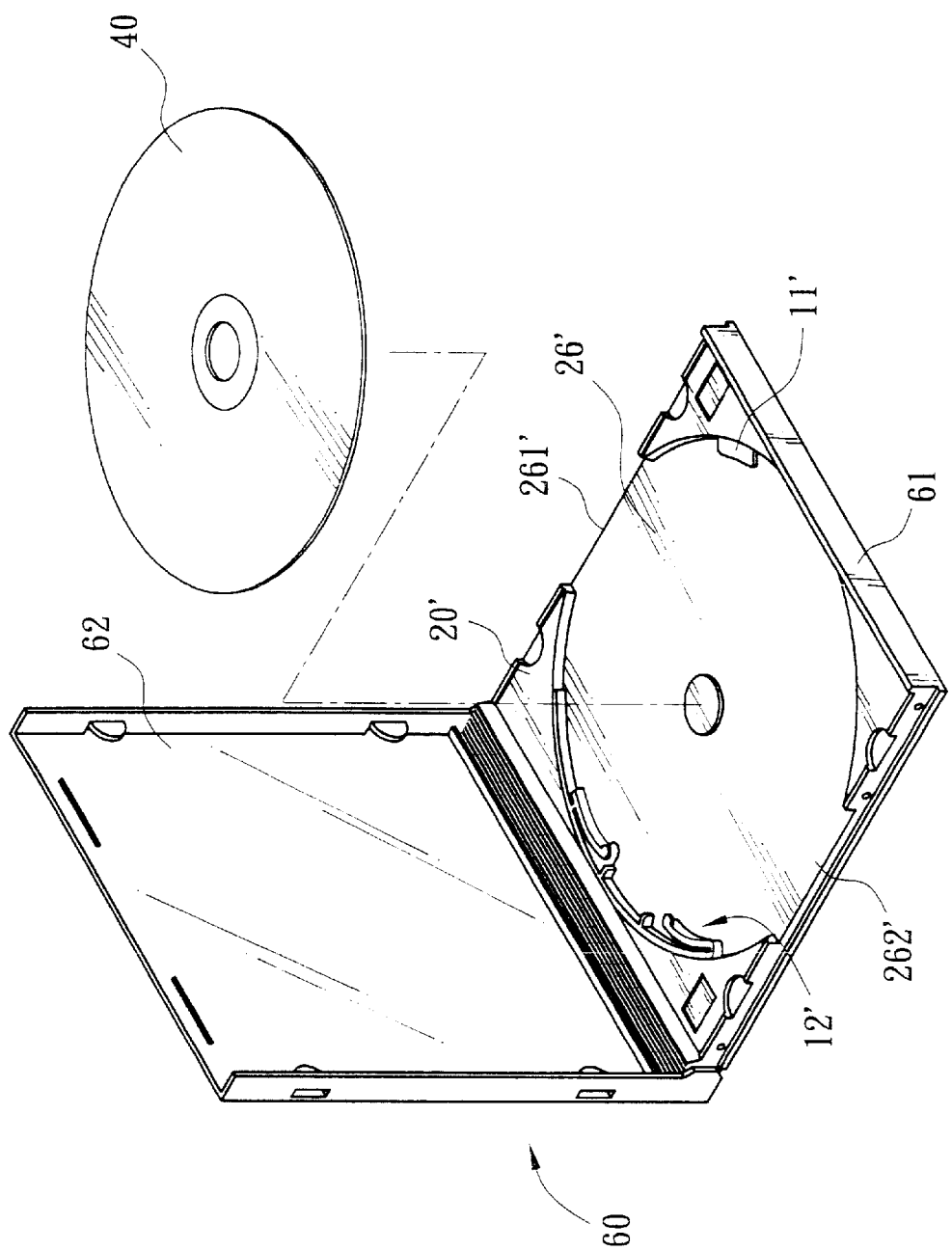
FIG. 8 is a perspective view of a second embodiment of the present invention.
Figure 10:
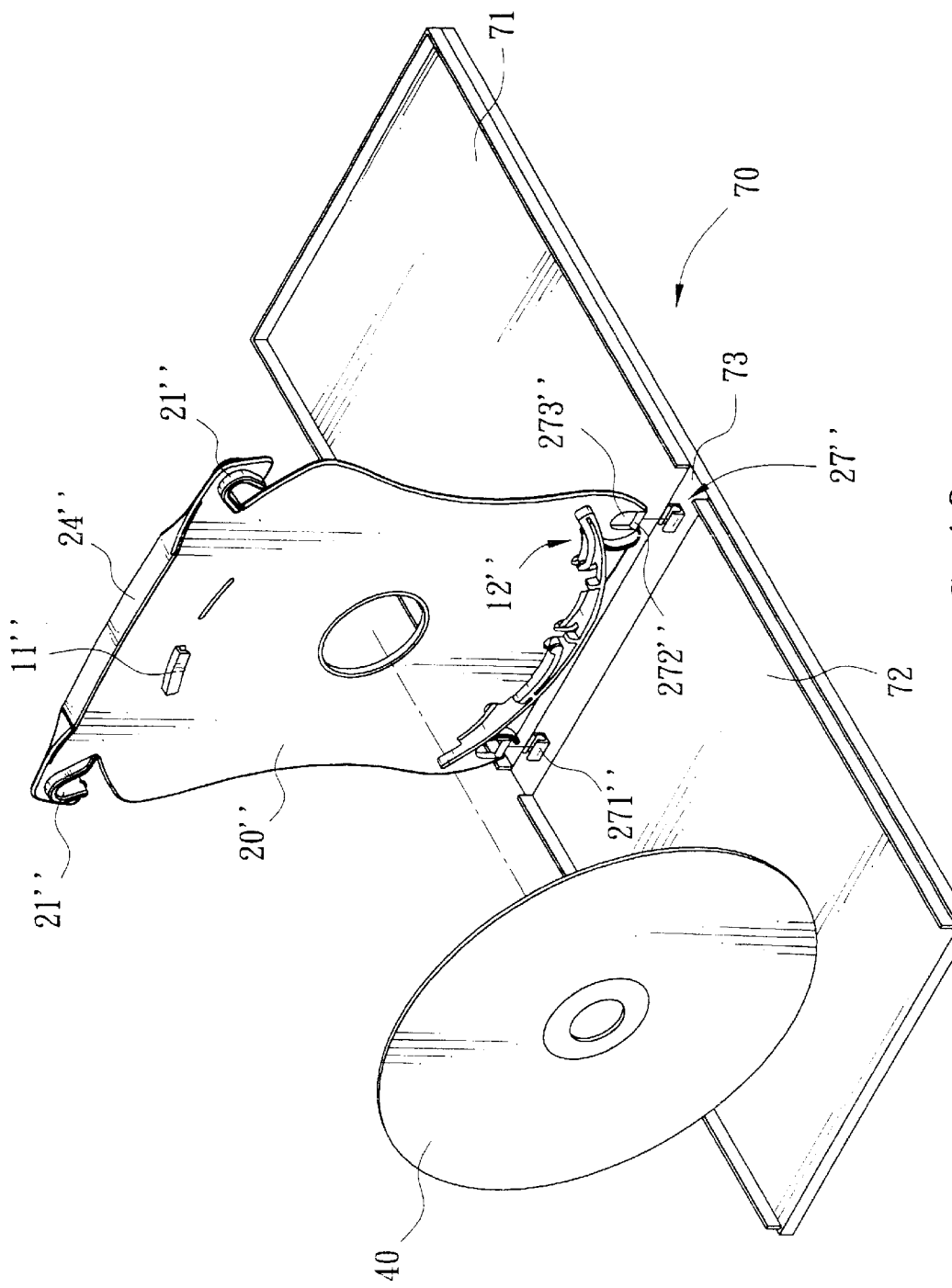
FIG. 10 is a perspective view of a third embodiment of the present invention.

The present invention provides a fastening device for an optical disc holder. The disc holder mainly includes a carrier 20. Different embodiments of the carrier 20 are shown in FIGS. 2A, 8 and 10, and will be described as follows.

First Embodiment

Figure 2A:
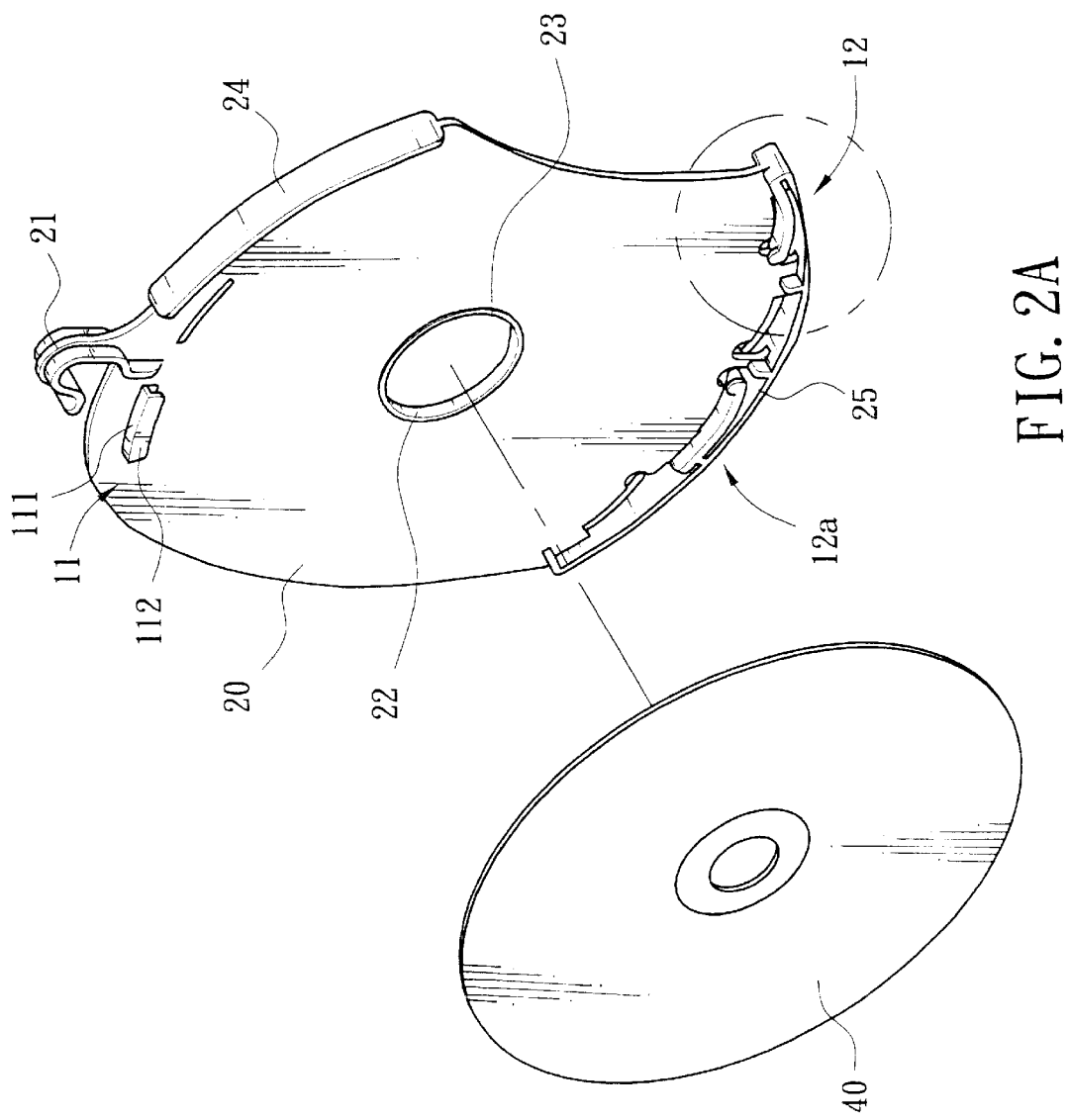
FIGS. 2A, 2B are perspective and plane views of an first embodiment of the present invention.
Figure 7:
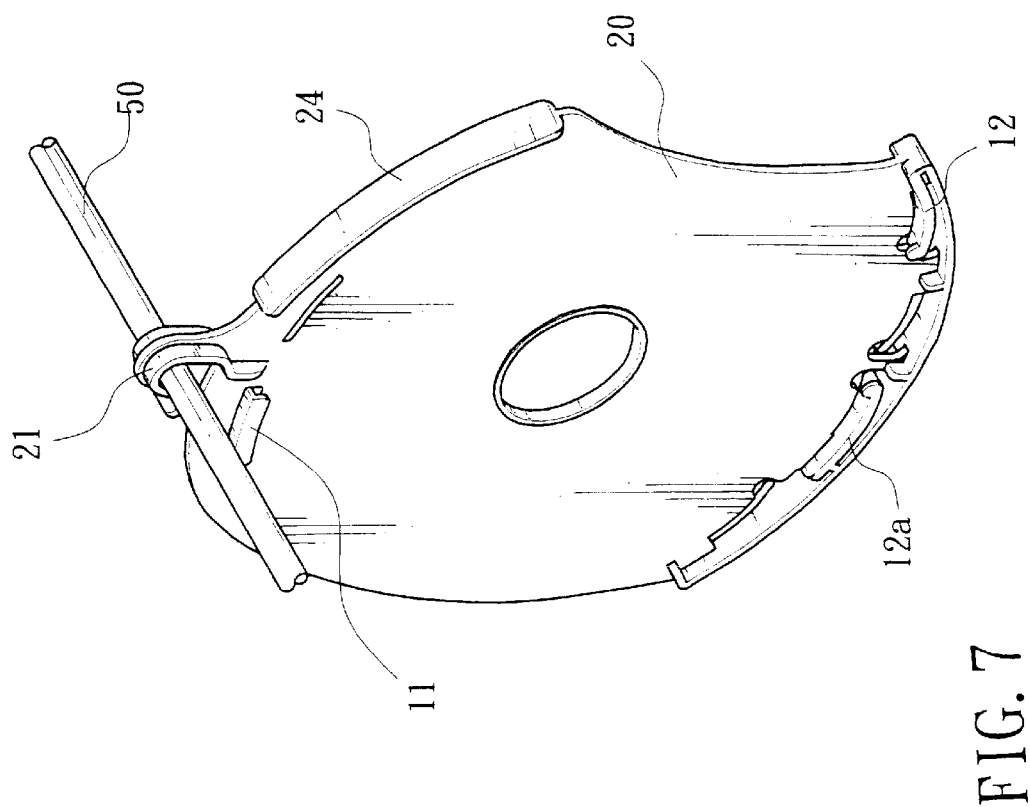
FIG. 7 is a perspective view showing an application example of the present invention.

As shown in FIG. 2A, a carrier 20 for holding at least an optical disc is a plate made of plastic by injection molding process. One end of the carrier 20 is extended with a hook 21 for hanging the carrier 20 on a rod 50 or a rope as shown in FIG. 7. The end for the hook 21 will be defined as top of the carrier 20. A through hole 22 larger enough for a finger to pass through is formed on the center portion of the carrier 20. A ring 23 with a suitable height from surface of the carrier 20 is formed around the through hole 22. A marking portion 24 is formed near the hook 21 at the rim of the carrier 20 for adhering a unshown label or sticker registering name or others of the disc so that the user can easily identify the disc. A protection wall 25 is formed at the bottom (opposite to the top) of the carrier 20. The wall 25 has a width larger than that of the carrier 20 for strengthen the carrier 20 and prevent it from being broken if falling to the ground.

Figure 3:
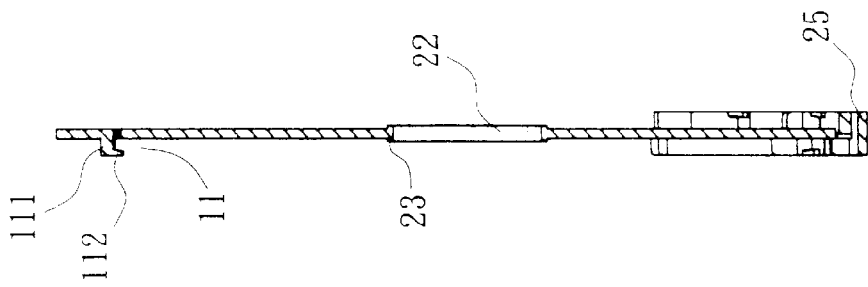
FIG. 3 is a sectional view taken along line A—A of FIG. 2B.
Figure 2B:
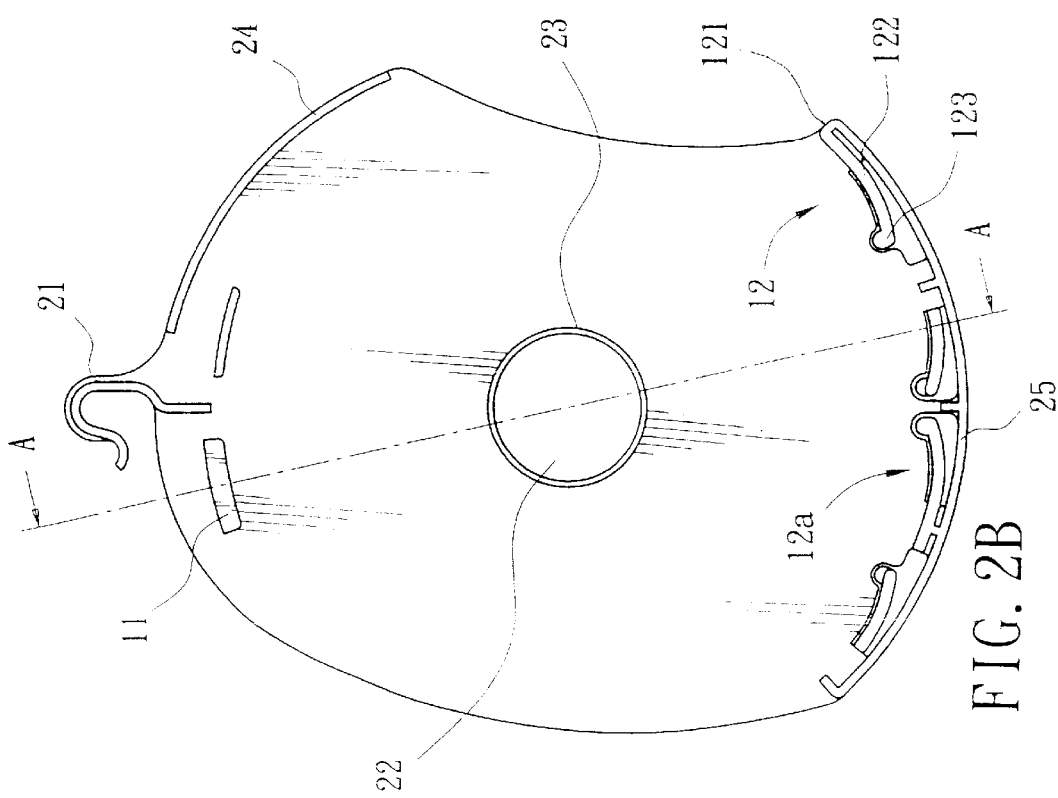

As shown in FIGS. 2A, 2B, the fastening device for an optical disc holder according to the present invention includes a fixed clamp 11 and at least a resilient clamp 12 formed on a carrier 20. The fixed clamp 11 locates near the hook 21 and the top of the carrier 20. The fixed clamp 11, as shown in FIG. 3, is formed with a first wall 111 extruding perpendicularly from surface of the carrier 20, and a second wall 112 extending from first wall 111 in a direction facing the bottom side of carrier 20. The height of the first wall 111 is larger than the thickness of the optical disc 40 so as to receive the disc 40. The first wall 111 is formed into a curve corresponding to the shape of the disc 40 in order to clamp the rim of the disc 40.

Figure 4:
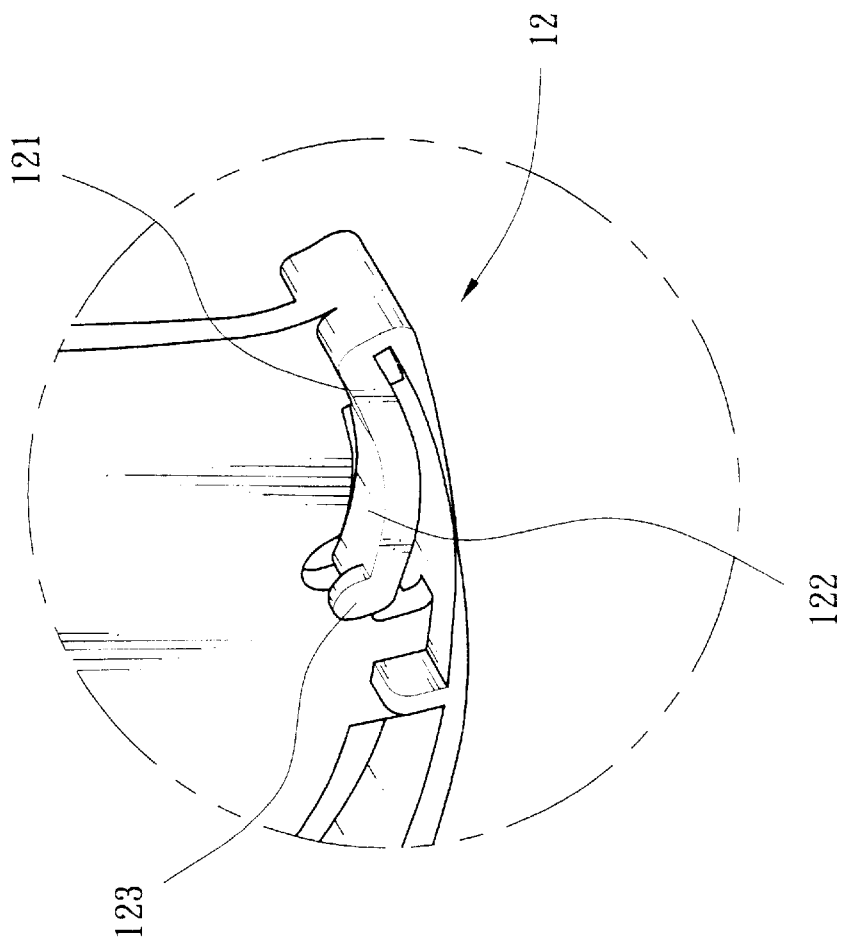
FIG. 4 is an enlarged partial view of a resilient clamp in the present invention.

The resilient clamp 12 is formed on the bottom, i.e., the opposite side to the fixed clamp 11, of the carrier 20. As shown in FIG. 4, the resilient clamp 12 includes a connecting portion 121 extending from the carrier 20, and a resilient portion 122 suspending from the connecting portion 121. By the suspension and the characteristics of plastic material, the resilient portion 122 is movable upon being forced downward till limited by the protection wall 25, and retrievable upon being released. The resilient portion 122 is also formed into a curve corresponding to the shape of the disc 40. A clamp portion 123 is formed on end of the resilient portion 122 extending in the direction to the top of the carrier 20 so as to clamp the optical disc 40. Practically, at least two resilient clamps 12 are formed (as shown).

As described above, in a fastening position, the fixed clamp 11 and the resilient clamps 12 will hold the rim of the disc 40 by resilient force of the resilient clamps 12. In a release position, the resilient clamps 12 can be pressed downward to an enlarged diameter for receiving the optical disc 40 moving into the fixed clamp 11 or releasing the optical disc 40 therefrom. In other words, the resilient clamps 12 locate at a head direction of insertion of the optical disc 40, while the fixes clamp locates at a tail direction of the insertion.

Figure 5B:
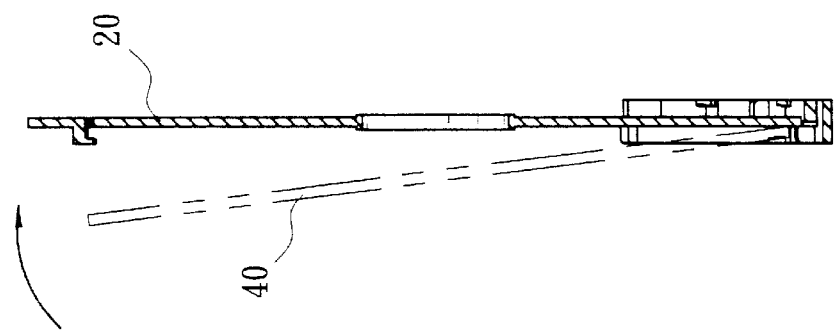
FIGS. 5A, 5B are functional front and side views of the present invention showing a disc being inserted.
Figure 5A:
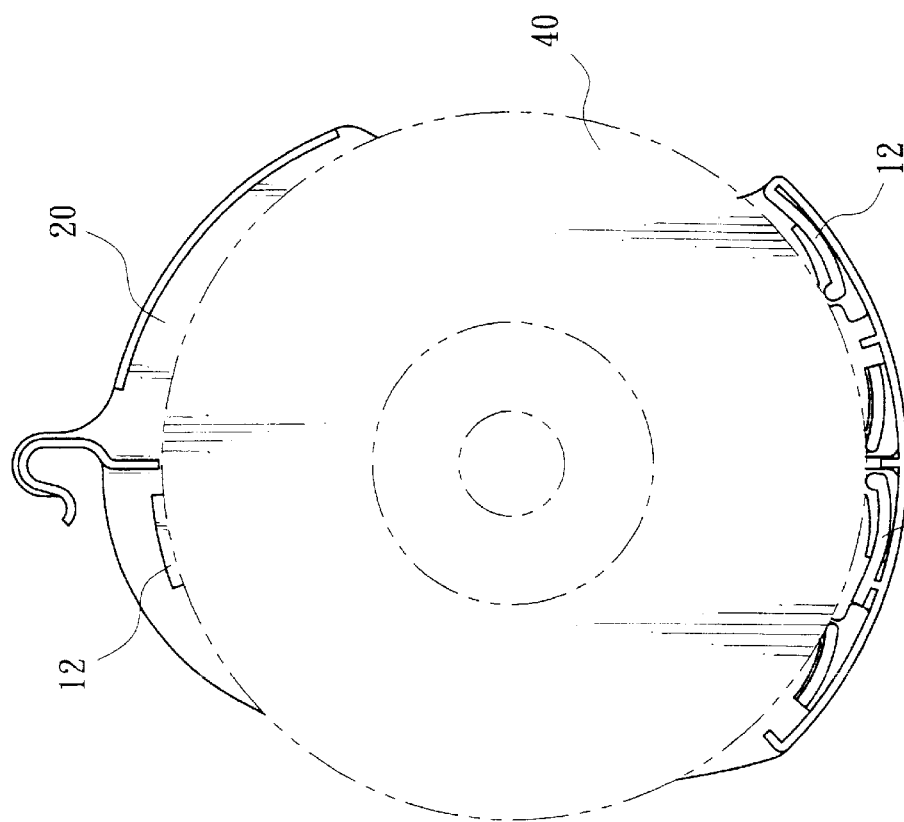

As shown in FIGS. 5A, 5B, when the optical disc 40 is to be stored into the carrier 20, the user can hold the disc 40 with the index finger passing through the center hole 41. Then, hold the carrier 20 with thumb at the protection wall 25, and insert the rim of the disc 40 into the resilient clamps 12. Further press downward the disc 40 till the top of the disc 40 moving into the fixed clamp 11. Finally, release the disc 40. The disc 40 is then fastened by the resilient clamps 12 that is retrieving upward and incorporating with the fixed clamp 11 to hold the rim of the disc 40, as shown in FIGS. 6A, 6B. On the contrary, when releasing the optical disc 40, the user can hold the disc 40 and the carrier 20 with the index finger and the thumb of one hand, then press the disc 40 downward to release it from the fixed clamp 11. Therefore, whenever fastening or releasing the optical disc 40, only one hand is needed for the operations. When the user holds the disc 40 by the index finger passing through the center hole 41 of the disc 40, and moves the disc 40 to the carrier 20, the center hole 41 corresponds to the center hole 22 of the carrier 20 so as to be free from interference to the operation. The ring 23 formed on the carrier 20 keeps the optical disc 40 a space from the carrier 20 so that the data portions of the disc 40 won't contact the carrier 20, and won't be ruined or damaged by friction.

Therefore, the user can remove an optical disc 40 from its original cassette, and store into a carrier 20 of the present invention. The carrier 20 having an optical disc stored thereon can be labeled with name at the marking portion 24 of the carrier 20, then hung on a rod 50 or a rope as shown in FIG. 7. The rod 70 or rope is mounted in an unshown cabinet or drawer for collecting a plurality of carriers of optical disc that can be easily searched through the labels.

Figure 2C:
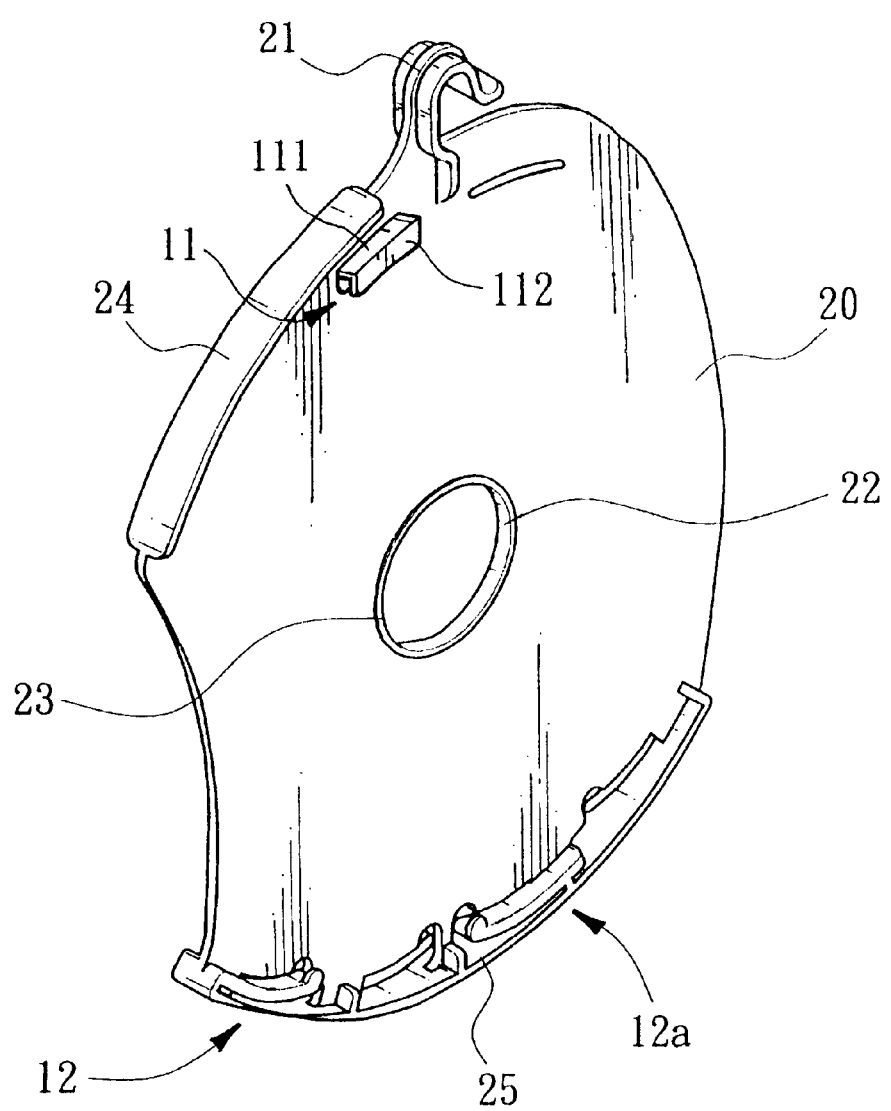
FIG. 2C is a perspective view of a rear side of the first embodiment.

Still referring to FIGS. 2A, 2B, two resilient clamps 12, 12a are formed symmetrically on the carrier 20 for more stable clamp function. Further, both surfaces of the carrier 20 are formed with fixed clamp 11 and resilient clamps 12, 12a so as to store two optical discs 40. The rear side of the carrier 20 is shown in FIG. 2C.

Second Embodiment

Different from the first embodiment of a plate carrier hanging on a rod or rope, the carrier of the second embodiment is a carrier mounted in a cassette.

Figure 9:
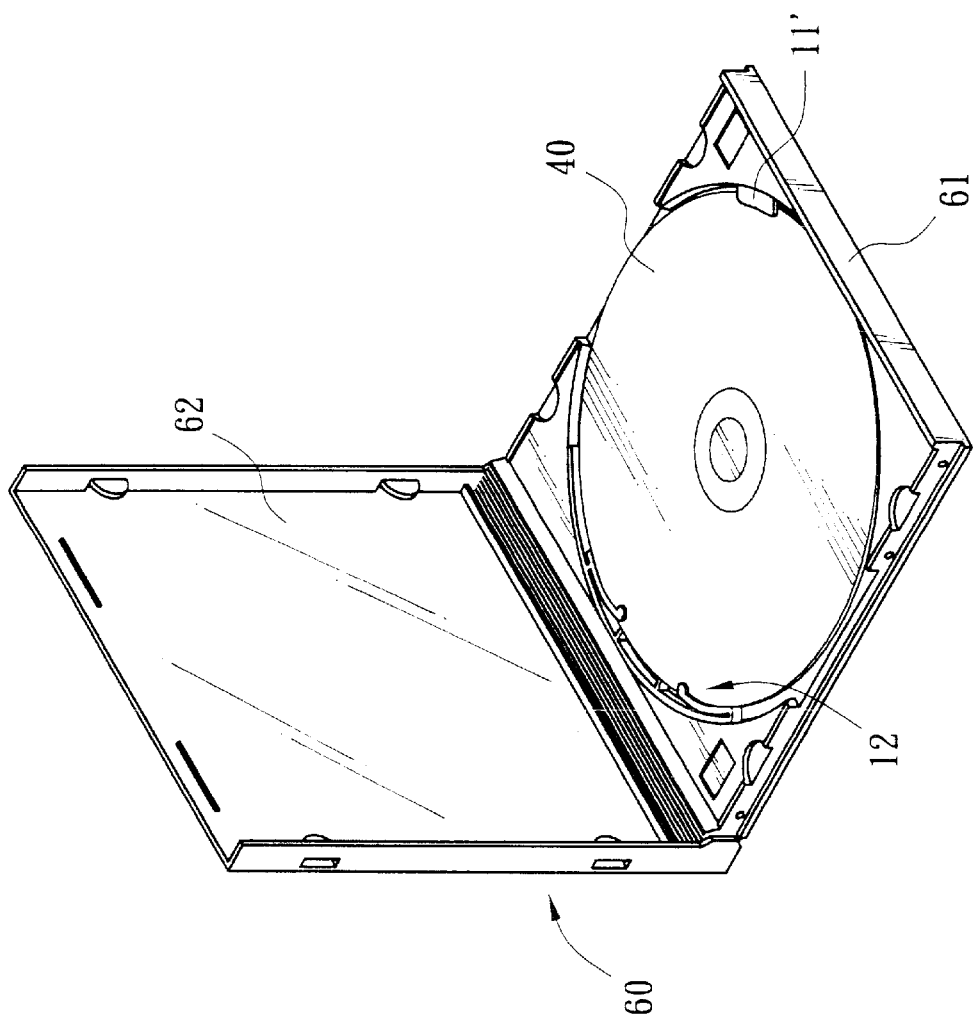
FIG. 9 is a usage view of the second embodiment of the present invention.

As shown in FIGS. 8 and 9, a fastening device for an optical disc holder according to the present invention includes a carrier 20' fixedly mounted in a cassette 60. The cassette 60 is composed of a base shell 61 and a cover 62. The base shell 61 includes a cavity for containing the carrier 20'. The cover 62 is pivotally mounted on one side of the base shell 61 so as to be folded for covering the base shell 61, or opened for access of the carrier 20'. The carrier 20' is preferably made of plastic as a unit having a circular receptacle 26' in the center for receiving an optical disc 40. The diameter and depth of the recess 26' fit with the size of the optical disc 40. A ring 23' is formed around the center of the receptacle 26' so as to keep a space between the optical disc 40 and the receptacle 26'. Two openings 261', 262' are formed on opposite sides of the receptacle 26 so that the optical disc 40 stored in the receptacle 26 can expose its rim therein for user to handle. The fastening device of the present invention includes a fixed clamp 11' and at least a resilient clamps 12'. The fixed clamp 11' extrudes from top of the rim of the receptacle 26 in radial direction toward center of the receptacle 26. Same as in the first embodiment, the resilient clamp 12' locates opposite to the fixed clamp 11' and forms a space for receiving the optical disc 40. After storing the optical disc 40 on the carrier 20', the base shell 61 and cover 62 can be closed to protect the optical disc 40.

Third Embodiment

Different from the first and second embodiments of carriers only for hanging or locating in a cassette, the carrier of the third embodiment is a carrier usable for both hanging and mounting in a cassette.

Figure 11:
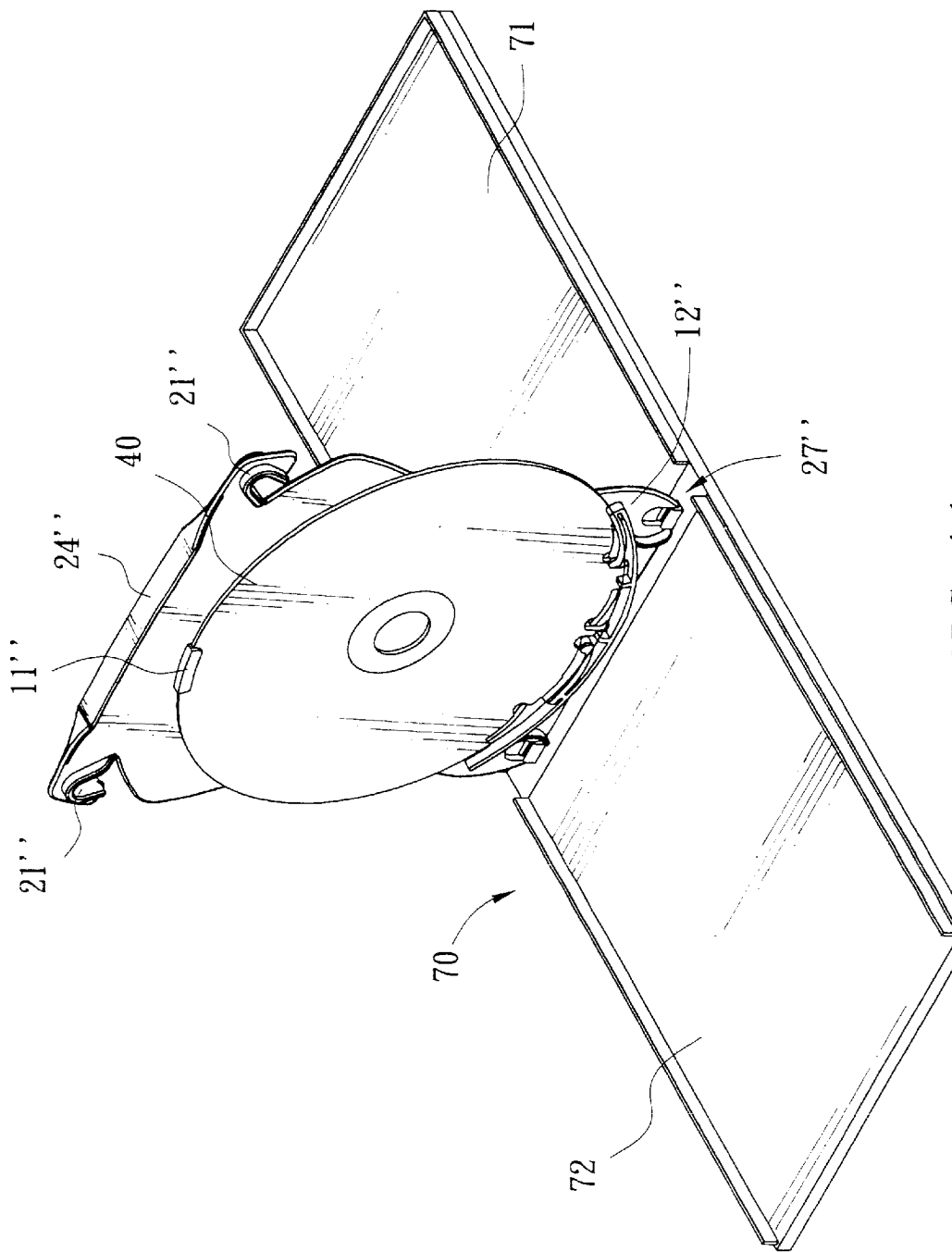
FIG. 11 is a usage view of the third embodiment of the present invention.

As shown in FIGS. 10 and 11, a fastening device for an optical disc holder according to the present invention includes a carrier 20" removably mounted in a box 70. The box 70 includes an upper shell 71, a lower shell 72 and a connecting wall 73, which is made of plastic into a unit. The upper shell 71 and the lower shell 72 form a cavity for holding the carrier 20". The connecting wall 73 pivotally connects the upper shell 71 and the lower shell 72, so that the upper shell 71 and the lower shell 72 can be folded to close, and opened to receive the optical disc 40.

The carrier 20" is similar to the carrier 20 of the first embodiment, but a marking portion 24" is formed on top of the carrier 20". Both sides of the marking portion 24" are formed with hooks 21". The fixed clamp 11" and resilient clamps 12" are similar to those of the first embodiment, and will not be detailedly described herein. Two linking elements 27" are further formed on the connecting wall 73 for linking the carrier 20". Each linking elements 27 includes a clamp 271" formed on the connecting wall 73, and a rod 272" fixed into a through hole 273" formed on bottom of the carrier 20". The clamp 271" can hold the rod 272" so as to fix the carrier 20" to the cassette 70, or release the rod 272" so as to remove the carrier 20" from the carrier 20".

Therefore, the user can selectively leave the carrier 20" in the cassette 70 for storing at least an optical disc 40, or remove the carrier 20" from the cassette 70, then hang the carrier 20" to an unshown rod or rope for storing the optical disc 40.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A fastening device applicable to a carrier for holding at least one optical disc, comprising:
   a fixed clamp on a top surface of the carrier; and
   at least one resilient clamp on a rim of the carrier at an opposite position to the fixed clamp, the at least one resilient clamp and fixed clamp holding a rim of an optical disc, the at least one resilient clamp including;
   a connection portion extending from the rim of the carrier,
   a resilient portion connected to the connection portion, and
   a clamp portion formed on an end of the resilient portion, the clamp portion extending in a direction toward the fixed clamp.

2. The fastening device for an optical disc holder according to claim 1, wherein the carrier further includes at least one hook for hanging the carrier.

3. The fastening device for an optical disc holder according to claim 2, wherein the fixed clamp is located under the hook.

4. The fastening device for an optical disc holder according to claim 1, wherein the carrier further includes a centrally located through hole and a ring extrusion formed around the through hole for supporting a central area of the optical disc.

5. The fastening device for an optical disc holder according to claim 1, wherein the carrier further includes a marking portion on a rim thereof for carrying a label.

6. The fastening device for an optical disc holder according to claim 1, wherein the carrier further includes a protective wall on an outer side of the resilient clamp for limiting an extent of movement of the resilient clamp.

7. The fastening device for an optical disc holder according to claim 1, wherein the fixed clamp includes a first wall extending perpendicularly from a top surface of the carrier, and a second wall extending from the first wall in a direction toward the resilient clamp, a height of the first wall being larger than a thickness of the optical disc.

8. The fastening device for an optical disc holder according to claim 1, wherein both sides of the carrier are formed with fixed clamps and resilient clamps whereby two optical discs are holdable by the carrier.

9. The fastening device for an optical disc holder according to claim 1, wherein the resilient clamp is movable toward and away from the fixed clamp for selectively receiving and releasing a rim of the disc by resilience of the resilient clamp.

10. The fastening device for an optical disc holder according to claim 1, wherein the resilient portion is formed with a curve corresponding to a shape of the optical disc.

11. The fastening device for an optical disc holder according to claim 1, wherein only one fixed clamp is provided.

12. A fastening device applicable to a carrier for holding at least one optical disc, comprising:
    a fixed clamp on a top surface of the carrier;
    at least one hook for hanging the carrier; and
    at least one resilient on a rim of the carrier at an opposite position to the fixed clamp, the at least one resilient clamp and fixed clamp holding a rim of an optical disc, the at least one resilient clamp including;
    a connection portion extending from the rim of the carrier,
    a resilient portion connected to the connection portion, and
    a clamp portion formed on an end of the resilient portion, the clamp portion extending in a direction toward the fixed clamp.

13. The fastening device for an optical disc holder according to claim 12, wherein the fixed clamp is located under the hook.

14. The fastening device for an optical disc holder according to claim 12, wherein the carrier further includes a centrally located through hole and a ring extrusion formed around the through hole for supporting a central area of the optical disc.

15. The fastening device for an optical disc holder according to claim 12, wherein the carrier further includes a marking portion on a rim thereof for carrying a label.

16. The fastening device for an optical disc holder according to claim 12, wherein the carrier further includes a protective wall on an outer side of the resilient clamp for limiting an extent of movement of the resilient clamp.

17. The fastening device for an optical disc holder according to claim 12, wherein the fixed clamp includes a first wall extending perpendicularly from a top surface of the carrier, and a second wall extending from the first wall in a direction toward the resilient clamp, a height of the first wall being larger than a thickness of the optical disc.

18. The fastening device for an optical disc holder according to claim 12, wherein both sides of the carrier are formed with fixed clamps and resilient clamps whereby two optical discs are holdable by the carrier.

19. The fastening device for an optical disc holder according to claim 12, wherein the resilient clamp is movable toward and away form the fixed clamp for selectively receiving and releasing a rim of the disc by resilience of the resilient clamp.

20. The fastening device for an optical disc holder according to claim 12, wherein the resilient portion is formed with a curve corresponding to a shape of the optical disc.

21. The fastening device for an optical disc holder according to claim 12, wherein only one fixed clamp is provided.

* * * * *